US012222859B2

(12) United States Patent
Wang et al.

(10) Patent No.: US 12,222,859 B2
(45) Date of Patent: Feb. 11, 2025

(54) WRITE DATA CACHE METHOD AND SYSTEM, DEVICE, AND STORAGE MEDIUM

(71) Applicant: SUZHOU METABRAIN INTELLIGENT TECHNOLOGY CO., LTD., Jiangsu (CN)

(72) Inventors: Jiang Wang, Jiangsu (CN); Shuqing Li, Jiangsu (CN); Huajin Sun, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/565,053

(22) PCT Filed: May 26, 2022

(86) PCT No.: PCT/CN2022/095380
§ 371 (c)(1),
(2) Date: Nov. 28, 2023

(87) PCT Pub. No.: WO2023/103296
PCT Pub. Date: Jun. 15, 2023

(65) Prior Publication Data
US 2024/0264940 A1 Aug. 8, 2024

(30) Foreign Application Priority Data

Dec. 9, 2021 (CN) .......................... 202111497794.3

(51) Int. Cl.
*G06F 12/08* (2016.01)
*G06F 12/0804* (2016.01)

(52) U.S. Cl.
CPC .... *G06F 12/0804* (2013.01); *G06F 2212/603* (2013.01)

(58) Field of Classification Search
CPC ....... G06F 12/00; G06F 12/0804; G06F 13/00
See application file for complete search history.

(56) References Cited

U.S. PATENT DOCUMENTS

| 5,517,626 A | * | 5/1996 | Archer | G06F 13/28 |
| | | | | 710/110 |
| 6,311,258 B1 | * | 10/2001 | Gibson | G06F 9/3879 |
| | | | | 711/212 |

(Continued)

FOREIGN PATENT DOCUMENTS

| CN | 105453062 A | 3/2016 |
| CN | 108959117 A | 12/2018 |

(Continued)

OTHER PUBLICATIONS

Bo Hu "Design and implementation analysis of heterogeneous architecture for database query acceleration." Changjiang Information and Communication, vol. 34, No. 9 (2021).

(Continued)

*Primary Examiner* — Tuan V Thai
(74) *Attorney, Agent, or Firm* — IPro, PLLC

(57) ABSTRACT

A method and system for high-speed caching of data writing, a device and a storage medium. The method includes: in response to receiving a data-writing operating instruction emitted by a host, creating a controlling page table and filling sequentially a plurality of control blocks into the controlling page table; submitting an entry pointer of a first instance of the control blocks to a work-queue scheduling engine, to execute tasks corresponding to the plurality of control blocks alternately in the work-queue scheduling engine; sending in advance a completion response to the host and notifying a firmware to perform subsequent processing and falling-into-disk of data; and in response to ending of execution of a task corresponding to a last one (Continued)

instance of the control blocks, releasing a used resource of the controlling page table.

20 Claims, 4 Drawing Sheets

(56) References Cited

U.S. PATENT DOCUMENTS

| | | | |
|---|---|---|---|
| 6,336,180 B1 * | 1/2002 | Long | G06F 9/3879 |
| | | | 712/E9.067 |
| 2012/0303855 A1 | 11/2012 | Bakke et al. | |

FOREIGN PATENT DOCUMENTS

| | | |
|---|---|---|
| CN | 109976953 A | 7/2019 |
| CN | 111642137 A | 9/2020 |
| CN | 113885945 A | 1/2022 |
| CN | 113918101 A | 1/2022 |

OTHER PUBLICATIONS

Theurich, Klaus, et al. "Advanced firmware verification using a code simulator for the IBM System z9." IBM journal of research and development 51.1.2 (2007): 207-216.

* cited by examiner

WRITE DATA CACHE METHOD AND SYSTEM, DEVICE, AND STORAGE MEDIUM

CROSS REFERENCE TO RELEVANT APPLICATIONS

The present application claims the priority of the Chinese patent application filed on Dec. 9, 2021 before the Chinese Patent Office with the application number of 202111497794.3 and the title of "method and system for high-speed caching of data writing, device and storage medium", which is incorporated herein in its entirety by reference.

TECHNICAL FIELD

The present application relates to a method and system for high-speed caching of data writing, device and storage medium.

BACKGROUND

In recent years, with the rise of technology of Computational Storage, the computational-storage architecture, by unloading data calculation from the Central Processing Unit (CPU) of a host to a data-processing accelerating unit close to the storage unit, reduces the operations of the migration of the corresponding data, thereby releasing the system performance as much as possible.

The computational storage introduces three product forms, namely Computational Storage Processor (CSP), Computational Storage Drive (CSD) and Computational Storage Array (CSA), and expects to, by redefining the architecture, reduce occupancy rate of the CPU, reduce the consumption of network and Double Data Rate (DDR, or Double-Speed Synchronous Dynamic Random Access memory) bandwidth, reduce power consumption of the system, support the processing of potential massively parallel computation, and so on.

In the computational storage system, a typical application is using the built-in DDR of the computational storage system as the data cache, to cache the data of the read/write operations of the host, the purpose of which is to reduce the Input Output (IO) operation delay of the system. Taking the undertake of an IO writing operation of the host as an example, normally, it is required to respond to the host merely after the data is reliably fallen into the disk. However, after the function of high-speed caching (Write Cache) is turned on, the computational storage system sends a responding signal to the host immediately after moving the to-be fallen-into-disk data of the host from the host DDR into the region of the local DDR that undergoes powering-down protection, so that the host considers that the data have already completed the "falling-into-disk" operation. However, in fact, the relevant operations by the computational storage system for this data block are still being carried out stepwisely inside the system, and the falling-into-disk operation will be performed finally after the processing is completed and some other conditions are satisfied.

SUMMARY

On the basis of the embodiments according to the present application, a first aspect of the embodiments of the present application provides a method for high-speed caching of data writing, wherein the method includes the steps of:

in response to receiving a data-writing operating instruction sent by a host, creating a controlling page table and filling a plurality of control data blocks into the controlling page table sequentially;

submitting an entry pointer of a first instance of the plurality of control data blocks to a work-queue scheduling engine, to execute tasks corresponding to the plurality of control data blocks alternately in the work-queue scheduling engine;

sending a completion response to the host in advance and notifying a firmware to perform subsequent processing and falling-into-disk of data; and in response to the completion of execution of a task corresponding to a last one instance of the plurality of control data blocks, releasing a used resource of the controlling page table.

In one or more embodiments, the last one instance of the control data blocks refers to a last control data block of a step required by a subsequent operation after the firmware takes over.

In one or more embodiments, the step of, creating the controlling page table and filling the plurality of control data blocks into the controlling page table sequentially includes:

filling a first control data block into the controlling page table, to provide an internal-memory region in a local double-speed synchronous dynamic random access memory;

filling a second control data block into the controlling page table, to migrate to-be-written data in a host double-speed synchronous dynamic random access memory into the internal-memory region; and filling a third control data block into the controlling page table, to respond to the host and end a current inputting-outputting.

In one or more embodiments, the method further includes:
performing powering-down protection to written data within the internal-memory region in the local double-speed synchronous dynamic random access memory.

In one or more embodiments, the method further includes:
in response to a space of the controlling page table being insufficient, applying for a new controlling-page-table space to create a new controlling page table, and initializing the new controlling page table and the original controlling page table into a chain controlling page table.

In one or more embodiments, the method further includes:
in response to receiving a read-data operating instruction sent by the host, creating a blank controlling page table and backing up the read-data operating instruction into the blank controlling page table.

In one or more embodiments, the method further includes:
setting up a continuous storage space in an on-chip storage to be used as a resource pool of controlling page tables, and initializing an address pointer of each of the controlling page tables into an idle-controlling-page-table-entry list.

In one or more embodiments, the method further includes:
determining whether counting of the controlling page tables that already applied for by the firmware controlling page table is smaller than a threshold; and
in response to the counting of the controlling page tables that already applied for by the firmware controlling page table being smaller than the threshold, adding one to the counting of the controlling page tables that already applied for by the firmware controlling page table, and subtracting one from counting of the controlling page tables that already applied for by an interface-managing-engine of the host.

Another aspect of the embodiments of the present application provides a system for high-speed caching of data writing, wherein the system includes:

a creating module configured for, in response to receiving a data-writing operating instruction sent by a host, creating a controlling page table and filling a plurality of control data blocks into the controlling page table sequentially;

a submitting module configured for submitting an entry pointer of a first instance of the plurality of control data blocks to a work-queue scheduling engine, to execute tasks corresponding to the plurality of control data blocks alternately in the work-queue scheduling engine;

a notifying module configured for sending a completion response to the host in advance and notifying a firmware to perform subsequent processing and falling-into-disk of data; and a releasing module configured for, in response to the completion of execution of a task corresponding to a last one instance of the plurality of control data blocks, releasing a used resource of the controlling page table.

Yet another aspect of the embodiments of the present application provides a computer device, wherein the computer device includes one or more processors and a memory, the memory stores a computer-readable instruction executable in the processors, and the computer-readable instruction, when executed by the one or more processors, causes the one or more processors to implement the steps of the method for high-speed caching of data writing according to any one of the above embodiments.

Still another aspect of the embodiments of the present application further provides one or more non-transitory computer-readable storage mediums storing a computer-readable instruction, wherein the computer-readable instruction, when executed by one or more processors, causes the one or more processors to implement the steps of the method for high-speed caching of data writing according to any one of the above embodiments.

The details of one or more embodiments of the present application are provided in the following drawings and description. The other characteristics and advantages of the present application will become apparent from the description, the drawings and the claims.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art is capable to obtain other embodiments according to these figures without paying creative work.

DETAILED DESCRIPTION

In order to make the objects, the technical solutions and the advantages of the present application clearer, the embodiments of the present application will be described in further detail with reference to the embodiments and the drawings.

It should be noted that, all of the expressions that using "first" and "second" in the embodiments of the present application are intended to distinguish two different entities or different parameters that have the same names. It is capable to be seen that "first" and "second" are merely for the convenience of the expression, and should not be construed as a limitation on the embodiments of the present application, which will not be explained in detail in the subsequent embodiments.

Figure 1:
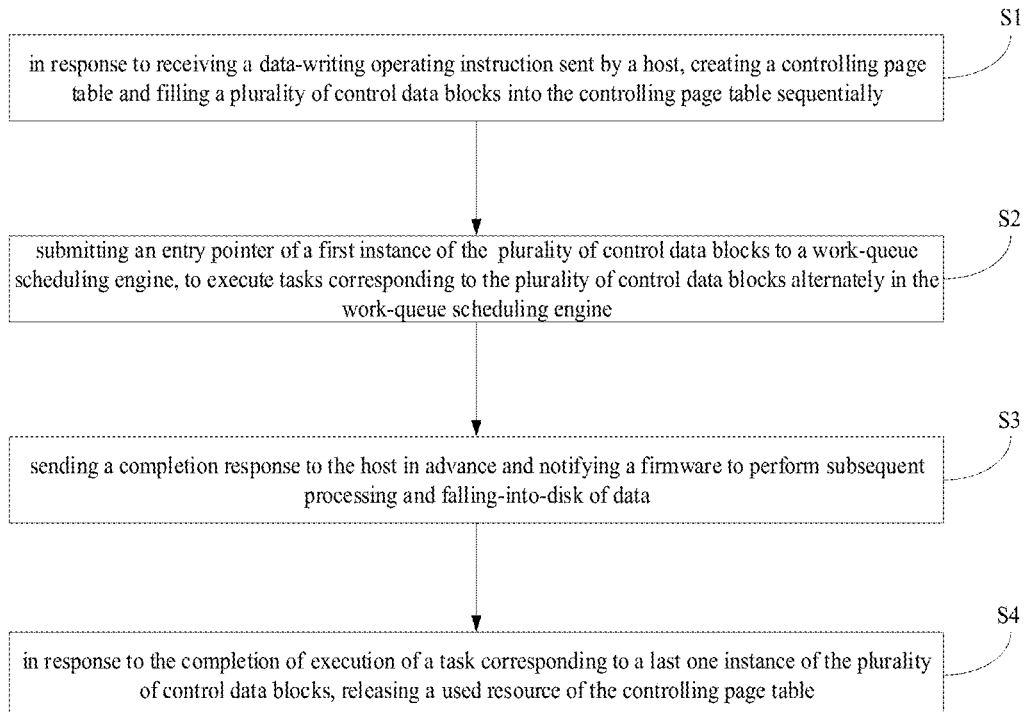
FIG. 1 is a schematic diagram of an embodiment of the method for high-speed caching of data writing according to the present application.

The first aspect of the embodiments of the present application provides an embodiment of a method for high-speed caching of data writing. FIG. 1 shows a schematic diagram of an embodiment of the method for high-speed caching of data writing according to the present application. As shown in FIG. 1, the embodiment of the present application includes the following steps:

S1: In response to receiving a data-writing operating instruction sent by a host, creating a controlling page table and filling a plurality of control data blocks into the controlling page table sequentially;

S2: Submitting an entry pointer of a first instance of the plurality of control data blocks to a work-queue scheduling engine, to execute tasks corresponding to the plurality of control data blocks alternately in the work-queue scheduling engine;

S3: Sending a completion response to the host in advance and notifying a firmware to perform subsequent processing and falling-into-disk of data; and S4: in response to the completion of execution of a task corresponding to a last one instance of the plurality of control data blocks, releasing a used resource of the controlling page table.

Figure 2:
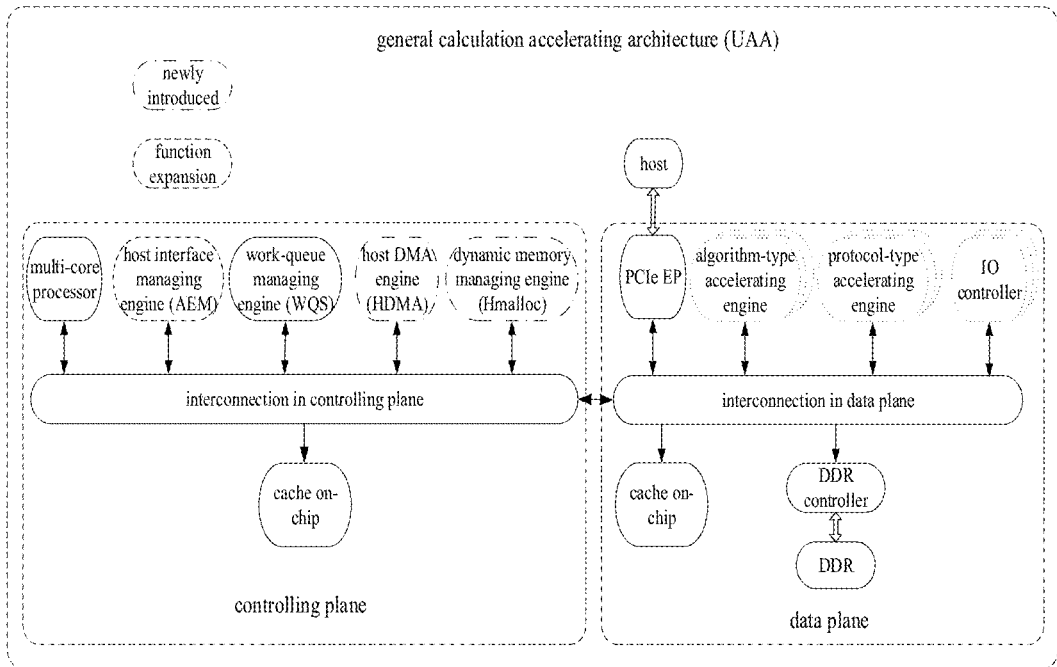
FIG. 2 is a schematic diagram of a general calculation accelerating architecture according to the present application.

The core concept of the present application is to require a special hardware to unload the functions of part of the firmware, and properly integrate them. FIG. 2 is a schematic diagram of a general calculation accelerating architecture according to the present application. As shown in FIG. 2, the embodiment of the present application introduces two new engines into the controlling plane, wherein a Host Direct Memory Access (HDMA) engine serves to move data between the host DDR and the local DDR, and a dynamic memory management engine (Hmalloc: HW Malloc, hardware dynamic memory management), as a hardware module, serves to manage the allocation and the releasing of the local DDR. The embodiment of the present application expands the function of an Acceleration Engine Manager (AEM, or host interface management engine), so that it may also create a Control Page (CP, or controlling page table) and compile a control data block (CB), therefore, before the firmware operation is introduced, a series of inherent operations are completed by relying on the hardware module solely.

Figure 3:
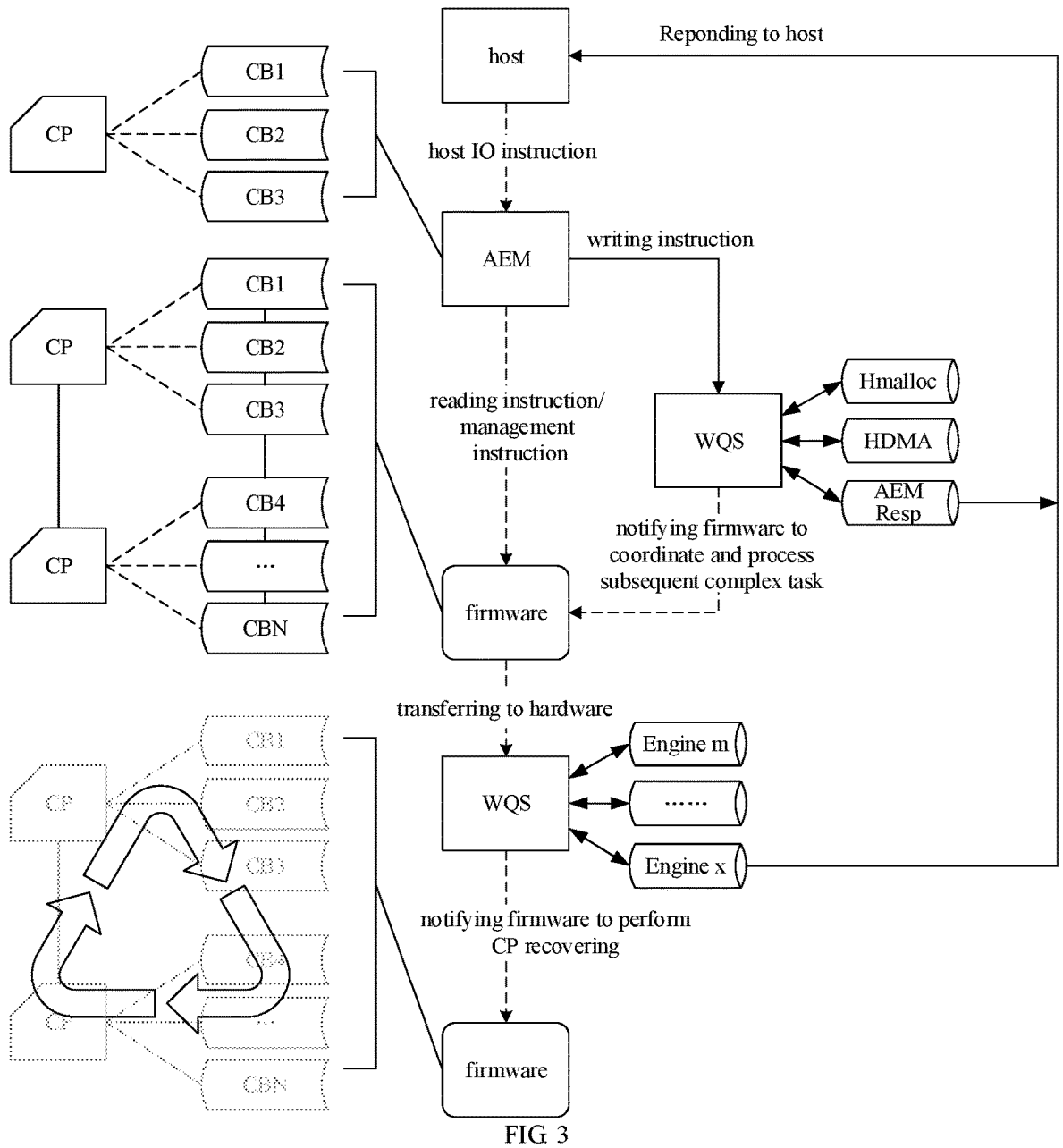
FIG. 3 is a schematic flow chart of the processing of the general calculation accelerating architecture according to the present application.

FIG. 3 shows a schematic flow chart of the processing of the general calculation accelerating architecture according to the present application. The embodiments of the present application are described with reference to FIG. 3.

As shown in FIG. 3, in response to receiving a data-writing operating instruction sent by a host, a controlling page table is created and a plurality of control data blocks are filled sequentially into the controlling page table. The host interface managing engine serves to interface the host instruction, and parse the host instruction. When it is a writing-IO operation instruction, the host interface managing engine creates a regular controlling page table, and fills a plurality of control data blocks into it sequentially. The embodiment of the present application has the following advantageous technical effects: the embodiment is suitable for the scenes of writing-caching enabling by using the cooperative scheduling process between the host interface managing engine and the firmware system, and the transfer of the controlling page table from the host interface managing engine to the firmware is realized by means of "zero copying", so that the delay of the responding by the computational storage system to the host is significantly reduced.

In one or more embodiments, the step of, creating the controlling page table and filling the plurality of control data blocks into the controlling page table sequentially includes: filling a first control data block into the controlling page table, to provide an internal-memory region in a local double-speed synchronous dynamic random access memory; filling a second control data block into the controlling page table, to migrate to-be-written data in a host double-speed synchronous dynamic random access memory into the internal-memory region; and filling a third control data block into the controlling page table, to respond to the host and end a current inputting-outputting. For example, a "Hmalloc" CB is configured to set up a block of internal memory in the local DDR by using the hardware engine. A "HDMA" CB is configured to move the data to-be-written in the host DDR into the storage space that is set up in the local DDR by using the hardware engine. An "AEM-Response" CB is configured to respond to the host by using the hardware engine, to indicate that the to-be-written data have already been processed, and the current IO is capable to be ended.

An entry pointer of a first instance of the plurality of control data blocks is submitted to a work-queue scheduling engine, to execute tasks corresponding to the plurality of control data blocks alternately in the work-queue scheduling engine. The host interface managing engine, after completed the above-mentioned operations, submits the entry pointer of the first instance of the plurality of control data block to a Work Queue Scheduler (WQS, or a work-queue scheduling engine) to perform automatic scheduling of the hardware, wherein the WQS serves to sequentially schedule the three tasks to be executed alternately between the engines.

A completion response is sent in advance to the host and the firmware is notified to perform subsequent processing and falling-into-disk of data. When a fake "completion" response is given to the host in advance, the firmware is notified to perform the subsequent processing and falling-into-disk of the data simultaneously, to form a quick responding path of the writing cache, so that the delay of the responding to the host is highly shortened.

In one or more embodiments, the method further includes: performing powering-down protection to written data within the internal-memory region in the local double-speed synchronous dynamic random access memory. After the function of writing caching has been turned on, because the host has already been responded to in advance, it is required to perform powering-down protection to the written data to be processed by the local DDR, or else a fatal error happens.

In one or more embodiments, the method further includes: in response to a space of the controlling page table being insufficient, applying for a new controlling-page-table space to create a new controlling page table, and initializing the new controlling page table and the original controlling page table into a chain controlling page table. After the firmware takes over, the control data block of the step required by the subsequent operation may be filled continuously into the first regular controlling page table. When the space of the controlling page table is insufficient, a new controlling-page-table space may continue to be applied for and be initialized into a chain controlling page table, and the remaining steps may be sequentially filled into the corresponding positions of the chain controlling page table.

In response to the completion of execution of a task corresponding to a last one instance of the plurality of control data blocks, releasing a used resource of the controlling page table. The firmware submits the entry pointer of the subsequently first control data block to the WQS to perform the automatic scheduling of the hardware. After the completion of the execution of the last one control data block, the firmware is notified, and releases the resource of the controlling page table used by this IO.

In one or more embodiments, the method further includes: in response to receiving a read-data operating instruction sent by the host, creating a blank controlling page table and backing up the read-data operating instruction into the blank controlling page table. When receiving another IO instruction, for example, a reading instruction or a management command instruction, the host interface managing engine is merely required to creates a "blank" controlling page table, and, after backing up the original IO instruction into this controlling page table, is capable to notify the firmware to take over and process by using the hardware event queue that the WQS is responsible for.

In the architecture definition of the general calculation accelerating architecture, the size of a controlling page table may be 512 bytes, 1024 bytes or 2048 bytes, and except the controlling page table head, the data cache and the original host IO-instruction backup, the whole of the remaining space is used to store the control data block. All of the controlling page tables are placed in a continuous memory space, thereby, a resource pool of the controlling page tables is formed. Furthermore, in order to facilitate the management on the resource pool of the controlling page table, the granularities of the controlling page tables in the single resource pool are required to maintain consistent. In other words, merely one size of the controlling page tables is capable to be selected. In order to realize the optimum performance of the high-speed caching of the written data, two problems are required to be solved, wherein the first is the allocation and the releasing of the CP resource, and the second is how to quickly transfer the CP applied for by the AEM to the firmware in the process of the interaction between the AEM and the firmware.

Regarding the first problem described above, the CP resource pool is managed by using a consistent hardware logic. Assuming that the total quantity of the CP resources in the CP resource pool is K, and, since both the AEM and the firmware apply for the CP, assuming that the upper limits of the quantities of the CPs that the AEM and the firmware apply for are m and n respectively, it is required to ensure that K=m+n.

Figure 4:
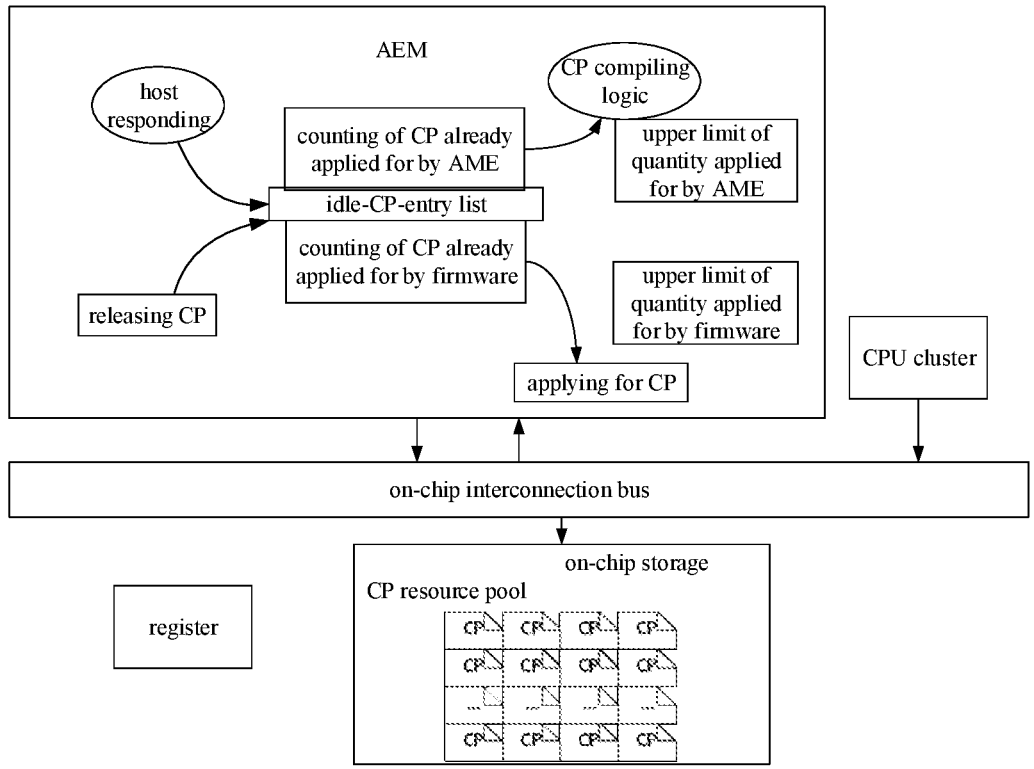
FIG. 4 is a schematic diagram of management of the resource pool of the controlling page table according to the present application.

In one or more embodiments, the method further includes: setting up a continuous storage space in an on-chip storage to be used as a resource pool of controlling page tables, and initializing an address pointer of each of the controlling page tables into an idle-controlling-page-table-entry list. FIG. 4 shows a schematic diagram of the management of the resource pool of the controlling page table according to the present application. A continuous storage space is set up in an on-chip storage for using as the resource pool of the CPs, and the address pointer of each of the CPs is initialized into an "idle-CP-entry list". Both of the "head" and "tail" pointers of this list are managed by the hardware. When the CP resource is applied, from the head pointer, the CP entry address is read and the already-applied-for counting values of the AEM and the firmware are updated. In the releasing of the CP resource, from the tail pointer, the to-be-released CP entry address is stored and the already-applied-for counting values of the AEM and the firmware are updated. The CP applying and CP releasing of the AEM are operated directly by using the hardware logic, while those of the firmware are completed by accessing a "CP applying" register and a "CP releasing" register. In the applying, the firmware directly tries reading the "CP applying" register, and, from a certain flag bit of the read content, determines whether it is an effective CP entry address. In the releasing, the firmware directly writes the entry address of the to-be-released CP into the "CP releasing" register, and the hardware logic writes it into the "idle-CP-entry list". The AEM and the firmware, in every time of applying the CP resources, compare the counters that they have already applied for with the corresponding upper quantity limits. If the upper quantity limits have already been reached, the applying of the current time fails, and a retry may been performed after a while.

In one or more embodiments, the method further includes: determining whether counting of the controlling page tables that already applied for by the firmware controlling page table is smaller than a threshold; and in response to the counting of the controlling page tables that already applied for by the firmware controlling page table being less than the threshold, adding one to the counting of the already-applied-for-by-firmware controlling page table, and subtracting one from counting of the controlling page tables that already applied for by an interface managing engine of the host. Regarding the second problem described above, when the AEM transfers the initially created CP to the firmware for subsequent processing, if the CP content is copied into the CP that the firmware newly applies for, and subsequently the CP that the AEM applies for is released, the consumption of the bus bandwidth is increased, and an additional delay is caused. In the embodiment of the present application, by the unified management of the CP resource pool described above, when the AEM transfers the CP to the firmware, it is realized by transferring the ownership of the CP. The AEM, after notifying the firmware by using the hardware event queue, by means of "subtracting one from the counting of the CP already applied for by the AEM", and simultaneously "adding one to the counting of the CP already applied for by the firmware", completes the transferring of the ownership of the CP. By such a mode of "zero copying", the AEM is capable to take over the next host management or IO request by using the added available CP resource, and the firmware continues serving for the subsequent processing till the end, and subsequently releases the CP resource.

The general calculation accelerating architecture according to the embodiments of the present application, by fixing some fixed steps, unloads the firmware, which, in the application scenes of IO writing Cache, the delay of the responding by the computational storage system to the host is significantly reduced.

It should be noted that, all of the steps according to the embodiments of the method for high-speed caching of data writing stated above-mentioned may be mutually mixed, replaced, added and deleted. Therefore, those reasonable arrangements, combinations and variations of the method for high-speed caching of data writing should also fall within the protection scope of the present application, and the protection scope of the present application should not be limited to the embodiments.

It should be understood that, although the steps of the flow chart in FIG. 1 are shown sequentially according to the indication by the arrows, those steps are not necessarily performed sequentially according to the sequence indicated by the arrows. Unless expressly described herein, the performances of those steps are not strictly limited by sequence, and these steps may be performed in other sequences. Furthermore, at least some of the steps in FIG. 1 may include a plurality of sub-steps or a plurality of stages, wherein those sub-steps or stages are not necessarily completely performed at the same moment, but may be performed at different moments, and the performance sequence of those sub-steps or stages is not necessarily sequential performance, but may be performance alternate with at least some of the other steps or the sub-steps or stages of the other steps.

Figure 5:
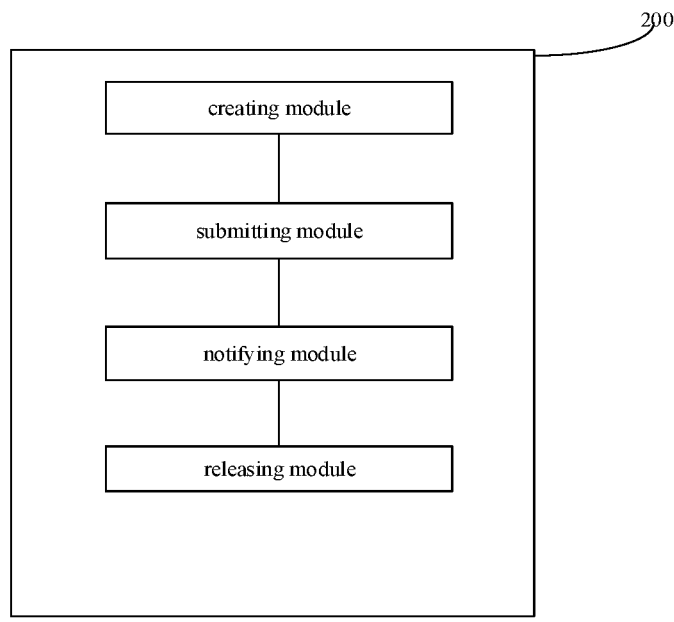
FIG. 5 is a schematic diagram of an embodiment of the system for high-speed caching of data writing according to the present application.

In order to achieve the above-mentioned object, the second aspect of the embodiments of the present application provides a system for high-speed caching of data writing. As shown in FIG. 5, the system 200 includes the following modules:

a creating module configured for, in response to receiving a data-writing operating instruction sent by a host, creating a controlling page table and filling a plurality of control data blocks into the controlling page table sequentially;

a submitting module configured for submitting an entry pointer of a first instance of the plurality of control data blocks to a work-queue scheduling engine, to execute tasks corresponding to the plurality of control data blocks alternately in the work-queue scheduling engine;

a notifying module configured for sending a completion response to the host in advance and notifying a firmware to perform subsequent processing and falling-into-disk of data; and a releasing module configured for, in response to the completion of execution of a task corresponding to a last one instance of the plurality of control data blocks, releasing a used resource of the controlling page table.

In one or more embodiments, the last control data block is configured to be used as a control data block of the step required by the subsequent operation after the firmware takes over.

In one or more embodiments, the creating module is configured for filling a first control data block into the controlling page table, to provide an internal-memory region in a local double-speed synchronous dynamic random access memory; filling a second control data block into the controlling page table, to migrate to-be-written data in a host double-speed synchronous dynamic random access memory into the internal-memory region; and filling a third control data block into the controlling page table, to respond to the host and end a current inputting-outputting.

In one or more embodiments, the system further includes a protecting module, and the protecting module is configured for performing powering-down protection to written data within the internal-memory region in the local double-speed synchronous dynamic random access memory.

In one or more embodiments, the system further includes an applying module, and the applying module is configured for, in response to a space of the controlling page table being insufficient, applying for a new controlling-page-table space to create a new controlling page table, and initializing the new controlling page table and the original controlling page table into a chain controlling page table.

In one or more embodiments, the system further includes a second creating module, and the second creating module is configured for, in response to receiving a read-data operating instruction sent by the host, creating a blank controlling page table and backing up the read-data operating instruction into the blank controlling page table.

In one or more embodiments, the system further includes a resource module, and the resource module is configured for setting up a continuous storage space in an on-chip storage to be used as a resource pool of controlling page tables, and initializing an address pointer of each of the controlling page tables into an idle-controlling-page-table-entry list.

In one or more embodiments, the system further includes a judging module, and the judging module is configured for determining whether counting of the controlling page tables that already applied for by the firmware controlling page table is smaller than a threshold; and in response to the counting of the controlling page tables that already applied for by the firmware controlling page table being smaller than the threshold, adding one to the counting of the controlling page tables that already applied for by the firmware controlling page table, and subtracting one from counting of the controlling page tables that already applied for by an inter-face-managing-engine of the host.

In order to achieve the above object, the third aspect of the embodiments of the present application provides a computer device, wherein the computer device includes a memory and one or more processors, the memory stores a computer-readable instruction, and the computer-readable instruction, when executed by the one or more processors, causes the one or more processors to implement the method for high-speed caching of data writing according to any one of the above embodiments.

Figure 6:
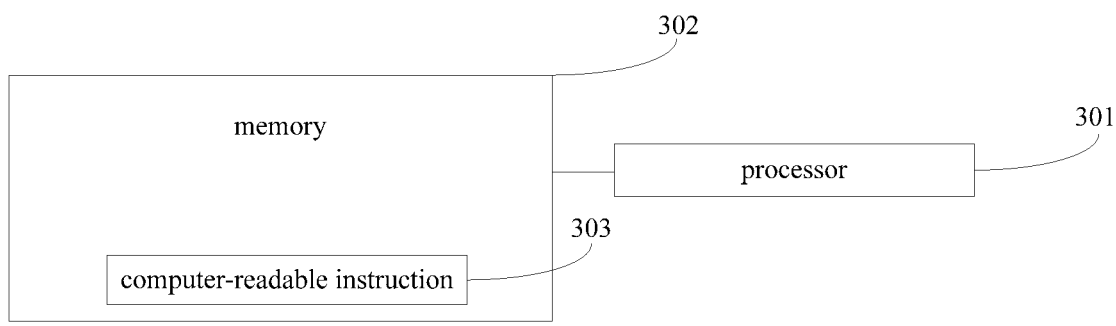
FIG. 6 is a schematic diagram of the hardware structure of an embodiment of the computer device for high-speed caching of data writing according to the present application.

As shown in FIG. 6, FIG. 6 is a schematic diagram of the hardware structure of one or more embodiments of the computer device for high-speed caching of data writing according to the present application.

Taking the device shown in FIG. 6 as an example, the device includes a processor 301 and a memory 302.

The processor 301 and the memory 302 may be connected by a bus or in another manner, and FIG. 6 illustrates by taking connection by a bus as an example.

The memory 302, as a non-transitory computer-readable storage medium, may be used to store a non-transitory software program, a non-transitory computer-executable program and a module, for example, the program instruction/module corresponding to the method for high-speed caching of data writing according to the embodiments of the present application. The processor 301, by executing the non-transitory software program, instruction and module stored in the memory 302, executes the various functional applications and data processing of the server, that is, implementing the method for high-speed caching of data writing.

The memory 302 may include a program storing region and a data storing region. The program storing region may store the operating system, and application programs required by at least one function. The data storing region may store the data, created by the usage of the method for high-speed caching of data writing, and so on. Furthermore, the memory 302 may include a high-speed random access memory, and may also include a non-transitory memory, for example, at least one magnetic-disk storage device, flash-memory device or other non-transitory solid-state memory device. In some embodiments, the memory 302 may be a memory provided remotely relative to the processor 301, and the remote memory may be connected to a local module via a network. Examples of the network above-mentioned include but are not limited to the Internet, an enterprise intranet, a local area network, a mobile communication net and a combination thereof.

One or more computer-readable instructions 303 corresponding to the method for high-speed caching of data writing are stored in the memory 302, and, when executed by the processor 301, implement the method for high-speed caching of data writing according to any of the above-mentioned embodiments.

Any one or more embodiments of the computer device that implements the method for high-speed caching of data writing stated above-mentioned are capable to reach an effect the same as or similar to those of any of the above-described embodiments of the method corresponding thereto.

The present application further provides one or more non-transitory computer-readable storage mediums storing a computer-readable instruction, wherein the computer-readable storage medium stores a computer-readable instruction that, when executed by a processor, implements the method for high-speed caching of data writing.

Figure 7:
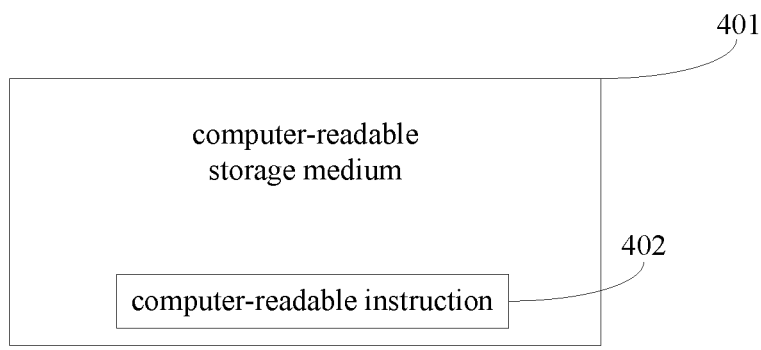
FIG. 7 is a schematic diagram of an embodiment of the computer storage medium for high-speed caching of data writing according to the present application.

As shown in FIG. 7, FIG. 7 is a schematic diagram of one or more embodiments of the computer storage medium for high-speed caching of data writing according to the present application. Taking the non-transitory computer-readable storage medium shown in FIG. 7 as an example, the computer-readable storage medium 401 stores a computer-readable instruction 402 that, when executed by a processor, implements the method stated above.

Finally, it should be noted that, a person skilled in the art is capable to understand that, all or some of the processes of the method according to the above-mentioned embodiments may be implemented by relative hardware according to an instruction from a computer-readable instruction. The program of the method for high-speed caching of data writing is stored in a computer-readable storage medium, and the program, when executed, may contain the processes of the embodiments of the method stated above. Wherein, the storage medium of the program may be a diskette, an optical disk, a Read-Only Memory (ROM), a Random Access Memory (RAM) and so on. The embodiments of the computer-readable instruction are capable to reach an effect the same as or similar to those of any of the above-described embodiments of the method corresponding thereto.

The illustrative embodiments disclosed by the present application are described above. However, it should be noted that many variations and modifications may be made without departing from the scope of the embodiments of the present application defined by the claims. The functions, steps and/or acts of the process claims according to the disclosed embodiments described herein are not required to be implemented in any specific sequence. Furthermore, although the elements of the embodiments of the present application are described or claimed in a singular form, unless explicitly limited as singular, they may also be comprehended as plural.

It should be understood that, as used herein, unless the context clearly supports an exception, the singular form "a" is intended to encompass a plural form. It should also be understood that, as used herein, the "and/or" refers to including any and all feasible combinations of one or more relatively listed items.

The serial numbers of the embodiments of the present application are merely for the purpose of description, and do not indicate the relative preferences of the embodiments.

A person skilled in the art is capable to understand that, all or some of the steps for implementing the above embodiments may be completed by hardware, and may also be completed by using a program to instruct relevant hardware. The program may be stored in a computer-readable storage medium. The above-mentioned storage medium may be a read-only memory, a magnetic disk, an optical disk and so on.

A person skilled in the art should understand that the discussion on any of the above embodiments is merely illustrative, and are not intended to imply that the scope (including the claims) of the embodiments of the present application is limited to those examples. With the concept of the embodiments of the present application, the embodiments or the technical features of different embodiments may be combined, and many other variations of different aspects of the embodiments of the present application as stated above may exist, which are not provided in detail for brevity. Therefore, any omissions, modifications, equivalent substitutions and improvements that are made within the spirit and the principle of the embodiments of the present application should fall within the protection scope of the embodiments of the present application.

The invention claimed is:

1. A method for high-speed caching of data writing, wherein the method comprises:
   in response to receiving a data-writing operating instruction sent by a host, creating a controlling page table and filling a plurality of control data blocks into the controlling page table sequentially;
   submitting an entry pointer of a first instance of the plurality of control data blocks to a work-queue scheduling engine, to execute tasks corresponding to the plurality of control data blocks alternately in the work-queue scheduling engine;
   sending a completion response to the host in advance and notifying a firmware to perform subsequent processing and falling-into-disk of data; and
   in response to the completion of execution of a task corresponding to a last one instance of the plurality of control data blocks, releasing a used resource of the controlling page table.

2. The method according to claim 1, wherein the step of, creating the controlling page table and filling the plurality of control data blocks into the controlling page table sequentially comprises:
   filling a first control data block into the controlling page table, to provide an internal-memory region in a local double-speed synchronous dynamic random access memory;
   filling a second control data block into the controlling page table, to migrate to-be-written data in a host double-speed synchronous dynamic random access memory into the internal-memory region; and
   filling a third control data block into the controlling page table, to respond to the host and end a current inputting-outputting.

3. The method according to claim 2, wherein the method further comprises:
   performing powering-down protection to written data within the internal-memory region in the local double-speed synchronous dynamic random access memory.

4. The method according to claim 1, wherein the method further comprises:
   in response to a space of the controlling page table being insufficient, applying for a new controlling-page-table space to create a new controlling page table, and initializing the new controlling page table and the original controlling page table into a chain controlling page table.

5. The method according to claim 1, wherein the method further comprises:
   in response to receiving a read-data operating instruction sent by the host, creating a blank controlling page table and backing up the read-data operating instruction into the blank controlling page table.

6. The method according to claim 1, wherein the method further comprises:
   setting up a continuous storage space in an on-chip storage to be used as a resource pool of controlling page tables, and initializing an address pointer of each of the controlling page tables into an idle-controlling-page-table-entry list.

7. The method according to claim 6, wherein the method further comprises:
   determining whether counting of the controlling page tables that already applied for by the firmware is smaller than a threshold; and
   in response to the counting of the controlling page tables that already applied for by the firmware being smaller than the threshold, adding one to the counting of the controlling page tables that already applied for by the firmware controlling page table, and subtracting one from counting of the controlling page tables that already applied for by an interface-managing-engine of the host.

8. The method according to claim 1, wherein the last one instance of the plurality of control data blocks refers to a last control data block of a step required by a subsequent operation after the firmware takes over.

9. A computer device, wherein the computer device comprises a memory and one or more processors, the memory stores a computer-readable instruction, and the computer-readable instruction, when executed by the one or more processors, causes the one or more processors to implement operations comprising:
   in response to receiving a data-writing operating instruction sent by a host, creating a controlling page table and filling a plurality of control data blocks into the controlling page table sequentially;
   submitting an entry pointer of a first instance of the plurality of control data blocks to a work-queue scheduling engine, to execute tasks corresponding to the plurality of control data blocks alternately in the work-queue scheduling engine;
   sending a completion response to the host in advance and notifying a firmware to perform subsequent processing and falling-into-disk of data; and in response to the completion of execution of a task corresponding to a last one instance of the plurality of control data blocks, releasing a used resource of the controlling page table.

10. One or more non-transitory computer-readable storage mediums storing a computer-readable instruction, wherein the computer-readable instruction, when executed by one or more processors, causes the one or more processors to implement operations comprising:
in response to receiving a data-writing operating instruction sent by a host, creating a controlling page table and filling a plurality of control data blocks into the controlling page table sequentially;
submitting an entry pointer of a first instance of the plurality of control data blocks to a work-queue scheduling engine, to execute tasks corresponding to the plurality of control data blocks alternately in the work-queue scheduling engine;
sending a completion response to the host in advance and notifying a firmware to perform subsequent processing and falling-into-disk of data; and
in response to the completion of execution of a task corresponding to a last one instance of the plurality of control data blocks, releasing a used resource of the controlling page table.

11. The method according to claim 6, wherein granularities of the controlling page tables in a single resource pool are consistent.

12. The method according to claim 6, wherein the resource pool is managed by using a consistent hardware logic.

13. The method according to claim 6, wherein both a head pointer and a tail pointer of the idle-controlling-page-table-entry list are managed by hardware.

14. The method according to claim 13, wherein when controlling page table (CP) resource is applied, from the head pointer, a CP entry address is read and already-applied-for counting values of the Acceleration Engine Manager (AEM) and the firmware are updated.

15. The method according to claim 14, wherein in the releasing of the CP resource, from the tail pointer, a to-be-released CP entry address is stored and the already-applied-for counting values of the AEM and the firmware are updated.

16. The method according to claim 15, wherein CP applying and CP releasing of the AEM are operated directly by using a hardware logic.

17. The method according to claim 15, wherein CP applying and CP releasing of the firmware are completed by accessing a CP applying register and a CP releasing register.

18. The method according to claim 15, wherein the method further comprises:
in the CP applying, by the firmware, directly reading the CP applying register, and, from a flag bit of read content, determining whether it is an effective CP entry address; and
in the CP releasing, directly writing, by the firmware, the entry address of the to-be-released CP into the CP releasing register, and writing, by the hardware logic, the to-be-released CP into the "idle-CP-entry list".

19. The method according to claim 7, wherein when the counting of the controlling page tables that already applied for by the firmware is equal to the threshold, the applying of the current time fails.

20. The method according to claim 1, wherein a size of the controlling page table is 512 bytes, 1024 bytes or 2048 bytes.

* * * * *